US009489634B2

(12) United States Patent
Bonderson

(10) Patent No.: US 9,489,634 B2
(45) Date of Patent: Nov. 8, 2016

(54) TOPOLOGICAL QUANTUM COMPUTATION VIA TUNABLE INTERACTIONS

(71) Applicant: Microsoft Corporation, Redmond, WA (US)

(72) Inventor: Parsa Bonderson, Santa Barbara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 762 days.

(21) Appl. No.: 13/834,860

(22) Filed: Mar. 15, 2013

(65) Prior Publication Data

US 2014/0279822 A1 Sep. 18, 2014

(51) Int. Cl.
*G06N 99/00* (2010.01)
*B82Y 10/00* (2011.01)

(52) U.S. Cl.
CPC ............ *G06N 99/002* (2013.01); *B82Y 10/00* (2013.01)

(58) Field of Classification Search
None
See application file for complete search history.

(56) References Cited

U.S. PATENT DOCUMENTS

| 8,209,279 B2 | 6/2012 | Freedman et al. | |
|---|---|---|---|
| 2012/0112168 A1* | 5/2012 | Bonderson | G06N 99/002 257/31 |
| 2013/0005580 A1 | 1/2013 | Bunyk et al. | |

OTHER PUBLICATIONS

"Measurement-only topological quantum computation via anyonic interferometry", P. Bonderson, M. Freedman, C. Nayak, Annals of Physics 324, 2009 pp. 787-826.*

Volovik, G.E., "Monopole, Half-Quantum Vortices and Nexus in Chiral Superfluids and Superconductors", In Journal of Experimental and Theoretical Physics Letters, vol. 70, Issue 12, Dec. 25, 1999, 4 pages.
Willett, et al., "Magnetic Field Induced Resistance Properties at Filling Factor 5/2 Consistent with Non-Abelian e/4 Quasiparticles in Multiple Sized Interferometers", retrieved from eprint of arXiv:1204.1993, Apr. 2012, 18 pages.
Willett, et al., "Measurement of Filling Factor 5/2 Quasiparticle Interference: Observation of e/4 and e/2 Period Oscillations", In Proceeding of the National Academy Sciences, vol. 106, Issue 22, Jun. 2, 2009, 26 pages.
Willett, et al., "Observation of an Even-Denominator Quantum Number in the Fractional Quantum Hall Effect", In Journal of Physical Review Letter, vol. 59, Issue 15, Oct. 12, 1987, 4 pages.
Xia, et al., "Electron Correlation in the Second Landau Level; A Competition between Many, Nearly Degenerate Quantum Phases", In Journal of Physical Review Letter, vol. 93, Issue 17, Oct. 22, 2004, 5 pages.
Goldin et al., "Comments on General Theory for Quantum Statistics in Two Dimensions", Physical Review Letters, Feb. 11, 1985, 54(6), pp. 603.
Alicea, Jason, "Majorana Fermions in a Tunable Semiconductor Device", In Journal of Physical Review B, vol. 81, Issue 12, Mar. 15, 2010, 10 pages.

(Continued)

*Primary Examiner* — Kakali Chaki
*Assistant Examiner* — Mai T Tran
(74) *Attorney, Agent, or Firm* — Steve Wight; Sandy Swain; Micky Minhas

(57) ABSTRACT

A quasiparticle interactor induces interactions between non-Abelian quasiparticles. State information is teleported between non-Abelian quasiparticles due to the interactions. The interactions induced by the quasiparticle interactor may be induced adiabatically and may be localized. The teleportation of state information may be utilized to generate quasiparticle exchange transformation operators acting on the state space of non-Abelian quasiparticles.

18 Claims, 9 Drawing Sheets

(56) References Cited

OTHER PUBLICATIONS

Alicea, et al., "Non-Abelian Statistics and Topological Quantum Information Processing in 1D Wire Networks", In Journal of Nature Physics, vol. 7, Issue 5, Feb. 13, 2011, 23 pages.

C, et al., "Anyonic Braiding in Optical Lattices", Abstract, In Proceedings of National Academy of Sciences of the United States of America, vol. 105, Issue 15, Apr. 15, 2008, 1 page.

"Anyonic Quantum Computing", Retrieved on: Mar. 8, 2013, Available at: http://zimp.zju.edu.cn/~xinwan/topo06/pdf/topo06_wang2.pdf, 32 pgs.

Bonderson, et al., "Measurement-Only Topological Quantum Computation via Anyonic Interferometry", In Journal of Annals of Physics, vol. 324, Issue 4, Apr. 2009, 57 pages.

Bonderson, et al., "A Blueprint for a Topologically Fault-tolerant Quantum Computer", In Proceedings of arXiv Preprint arXiv:1003.2856, Mar. 15, 2010, 5 pages.

Bonderson, et al., "Competing Topological Orders in the $v=12/5$ Quantum Hall State", In Journal of Physical Review Letter, vol. 108, Issue 3, Jan. 20, 2012, 5 pages.

Bonderson, et al., "Coulomb Blockade Doppelgangers in Quantum Hall States", In Proceedings of Physical Review B, vol. 81, Issue 16, Apr. 7, 2010, 12 pages.

Bonderson, et al., "Fractional Quantum Hall Hierarchy and the Second Landau Level", In Proceedings of Physical Review B, vol. 78, Issue 12, Article No. 125323, Sep. 15, 2008, 10 pages.

Bonderson, et al., "Interferometry of Non-Abelian Anyons", In Journal of Annals of Physics, vol. 323, Issue 11, Nov. 2008, 62 pages.

Bonderson, Parsa, "Measurement-Only Topological Quantum Computation via Tunable Interactions", In Journal of Physical Review B, vol. 87, Jan. 11, 2013, 10 pages.

Bonderson, et al., "Measurement-Only Topological Quantum Computation", In Journal of Physical Review Letter, vol. 101, Jun. 30, 2008, 5 pages.

Bonderson, Parsa, "Non-Abelian Anyons and Interferometry", In Ph.D Thesis Submitted at California Institute of Technology, May 23, 2007, 138 pages.

Bonderson, et al., "Plasma Analogy and Non-Abelian Statistics for Ising-type Quantum Hall States", In Proceedings of Physical Review B, vol. 83, Feb. 7, 2011, 68 pages.

Bonderson, Parsa, "Splitting the Topological Degeneracy of non-Abelian Anyons", In Physical Review Letter, vol. 103, Sep. 9, 2009, 5 pages.

Bravyi, et al., "Universal Quantum Computation with Ideal Clifford Gates and Noisy Ancillas", In Journal of Physical Review A, vol. 71, Feb. 22, 2005, 14 pages.

Burrello, et al., "Braiding of Non-Abelian Anyons Using Pairwise Interactions", In Journal of Physical Review A, vol. 87, Issue 2, Feb. 27, 2013, 8 pages.

Cheng, Meng, "Superconducting Proximity Effect on the Edge of Fractional Topological Insulators", In Journal of Physical Review B, vol. 86, Nov. 16, 2012, 7 pages.

Clarke, et al., "Exotic Non-Abelian Anyons from Conventional Fractional Quantum Hall States", In Journal of Nature Communication, vol. 4, Jan. 8, 2013, 12 pages.

Das, et al., "Evidence of Majorana Fermions in an Al—InAs Nanowire Topological Superconductor", In Proceedings of arXiv Preprint arXiv:1205.7073, Jul. 28, 2012, 49 pages.

Deng, et al., "Observation of Majorana Fermions in a Nb—InSb Nanowire-Nb Hybrid Quantum Device", In Proceedings of eprint of arXiv:1204.4130, Apr. 2012, 10 pages.

Eisenstein, et al., "Insulating and Fractional Quantum Hall States in the First Excited Landau Level", In Journal of Physical Review Letter, vol. 88, Issue 7, Feb. 18, 2002, 4 pages.

Fendley, Paul, "Parafermionic Edge Zero Modes in $Z_n$ Invariant Spin Chains", In Journal of Statistical Mechanics: Theory and Experiment, Oct. 2012, 22 pages.

Fredenhagen, et al., "Superselection Sectors with Braid Statistics and Exchange Algebras", In Journal of Communications in Mathematical Physics, vol. 125, Issue 2, Mar. 1989, 26 pages.

Freedman, et al., "Towards Universal Topological Quantum Computation in the $v=5/2$ Fractional Quantum Hall State", In Journal of Physical Review B, vol. 73, Issue 24, Jun. 2006, 23 pages.

Frohlich, J., "Braid Statistics in Local Quantum Theory", In Journal of Reviews in Mathematical Physics, vol. 2, Issue 3, Oct. 12, 1990, 103 pages.

Fu, et al., "Superconducting Proximity Effect and Majorana Fermions at the Surface of a Topological Insulator", In Journal of Physical Review Letter, vol. 100, Mar. 6, 2008, 4 pages.

Heck, et al., "Coulomb-Assisted Braiding of Majorana Fermions in a Josephson Junction Array", In New Journal of Physics, vol. 14, Mar. 28, 2012, 15 pages.

Kitaev, A. Yu., "Fault-Tolerant Quantum Computation by Anyons", In Journal of Annals Physics, vol. 303, Issue 1, Jul. 9, 1997, 27 pages.

Kitaev, A. Yu., "Fault-tolerant Quantum Computation by Anyons", In Journal of Annals of Physics, vol. 303, Issue 1, Jan. 2003, 29 pages.

Kitaev, Alexei Yu., "Unpaired Majorana Fermions in Quantum Wires", In Journal of Physics-Uspekhi, vol. 44, Issue 131, Oct. 2001, 7 pages.

Kumar, et al., "Nonconventional Odd Denominator Fractional Quantum Hall States in the Second Landau Level", In Journal of Physical Review Letter, vol. 105, Issue 24, Dec. 10, 2010, 4 pages.

Lee, et al., "Particle-Hole Symmetry and the $v=5/2$ Quantum Hall State", In Journal of Physical Review Letter, vol. 99, Issue 23, Dec. 7, 2007, 5 pages.

Leinaas, J. M., "On the Theory of Identical Particles", In Journal of II Nuovo Cimento B, vol. 37, Issue 1, Jan. 1, 1977, 25 pages.

Levin, et al., "Particle-Hole Symmetry and the Pfaffian State", In Journal of Physical Review Letter, vol. 99, Issue 23, Dec. 6, 2007, 5 pages.

Lindner, et al., "Fractionalizing Majorana Fermions: Non-Abelian Statistics on the Edges of Abelian Quantum Hall States", In Proceedings of Physical Review X, vol. 2, Issue 4, Article No. 041002, Oct. 11, 2012, 21 pages.

Lutchyn, et al., "Majorana Fermions and a Topological Phase Transition in Semiconductor-Superconductor Heterostructures", In Journal of Physical Review Letter, vol. 105, Issue 7, Aug. 13, 2010, 5 pages.

Moore, et al., "Nonabelions in the Fractional Quantum Hall Effect", In Journal of Nuclear Physics B, vol. 360, Issue 2-3, Aug. 19, 1991, 35 pages.

Mourik, et al., "Signatures of Majorana Fermions in Hybrid Superconductor-Semiconductor Nanowire Devices", In Journal of Science, vol. 336, Issue 6084, Apr. 5, 2012, 28 pages.

Nayak, et al., "Non-Abelian Anyons and Topological Quantum Computation", In Journal of Reviews of Modern Physics, vol. 80, Issue 3, Sep. 12, 2008, 73 pages.

Oreg, et al., "Helical Liquids and Majorana Bound States in Quantum Wires", In Journal of Physical Review Letter, vol. 105, Issue 17, Oct. 20, 2010, 5 pages.

Pachos, et al., "Focus on Topological Quantum Computation", In the Proceedings of New Journal of Physics, Mar. 8, 2013, 8 pages.

Pachos, Jiannis K., "Introduction to Topological Quantum Computation", Retrieved on: Mar. 8, 2013, Available at: http://www1.quantum.leeds.ac.uk/~phyjkp/index_files/JiannisPachosLecture.pdf, 41 pgs.

Pan, et al., "Exact Quantization of Even-Denominator Fractional Quantum Hall State at $v=5/2$ Landau Level Filling Factor", In Journal of Physical Review Letter, vol. 83, Issue 17, Oct. 25, 1999, 5 pages.

Radu, et al., "Quasiparticle Tunneling in the Fractional Quantum Hall State at $v=5/2$", In Journal of Science, vol. 320, Issue 5878, May 16, 2008, 6 pages.

Read, et al., "Paired States of Fermions in Two Dimensions with Breaking of Parity and Time-Reversal Symmetries, and the Fractional Quantum Hall Effect", In Journal of Physical Review B, vol. 61, Issue 15, Apr. 2000, 35 pages.

(56) References Cited

OTHER PUBLICATIONS

Rokhinson, et al., "Observation of the Fractional a.c. Josephson Effect and the Signature of Majorana Particles", In Journal of Nature Physics, vol. 8, Issue 11, Aug. 23, 2012, 17 pages.

Sau, et al., "A Generic New Platform for Topological Quantum Computation using Semiconductor Heterostructures", In Journal of Physical Review Letter, vol. 104, Issue 4, Jan. 27, 2010, 4 pages.

Sau, et al., "Controlling Non-Abelian Statistics of Majorana Fermions in Semiconductor Nanowires", In Journal of Physical Review B, vol. 84, Issue 9, Sep. 2011, 8 pages.

"Synthetic Quantum Systems & Quantum Simulation", Retrieved on: Mar. 8, 2013, Available at: http://equs.org/sqsqs, 3 pgs.

* cited by examiner

TOPOLOGICAL QUANTUM COMPUTATION VIA TUNABLE INTERACTIONS

BACKGROUND

Non-Abelian quasiparticles are collective excitations of topological phases that exhibit exotic exchange statistics. These include non-Abelian anyons, whose exchange statistics are governed by higher-dimensional representations of the braid group. Such quasiparticles collectively possess a multi-dimensional, non-local (topological) state space that is essentially immune to local perturbations. This property makes non-Abelian topological phases appealing platforms for quantum information processing, as they allow for topologically protected quantum computation (TQC). In the TQC approach, computational gates may be generated through topological operations, such as braiding exchanges of quasiparticles, in which case they are also topologically protected. The physical implementation of such protected gates poses one of the most significant challenges for realization of TQC.

The initial conception of TQC envisioned physically translocating non-Abelian quasiparticles to perform braiding operations as the primary means of generating gates. Proposals for moving quasiparticles include simply dragging them around (e.g., with a Scanning Tunneling Microscope (STM) tip, if they are electrically charged) and a "bucket brigade" series of induced hoppings from one site to the next, originating at one location and terminating at another. A subsequent proposal, known as "measurement-only TQC" (MOTQC), introduced methods of effectively generating braiding transformations on the state space, without physically moving the anyons associated with the state space.

SUMMARY

As discussed hereinbelow, this disclosure describes techniques for teleporting state information encoded by non-Abelian quasiparticles. In some embodiments, state information from a pair of computational non-Abelian quasiparticles is teleported to generate operations in the state space that are equivalent to operations obtained by exchanging the pair of computational non-Abelian quasiparticles. Teleportation of state information may include utilizing a pair of ancillary non-Abelian quasiparticles.

Example systems that may be used for teleporting state information may include a quasiparticle interactor, which may induce interactions between selected quasiparticles. The quasiparticle interactor may induce interactions adiabatically between selected quasiparticles. The quasiparticle interactor may alter, in a system having the quasiparticles, one or more of: local-chemical potential; local-Zeeman splitting; local-superconductor energy gap; or local-magnetic fields. ("Local" means in the vicinity of the quasiparticles being influenced and not "globally" over the entire system.)

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure describes utilizing tunable interactions of non-Abelian quasi particles.

This disclosure includes the following sections: Section A describes example networks in which non-Abelian quasiparticle state information may be teleported via tunable interactions and in which quasiparticle exchange transformations may be generated via tunable interactions; Section B describes an example framework for anyonic teleportation and generation of braiding transformations via tunable interactions.

A: Networks and Devices

This section includes subsections which describe example topological qubit arrays, topological qubit-wires, and non-Abelian quasiparticle state teleportation systems. In the following discussion, various features and component are discussed with respect to Majorana quasiparticles and Majorana nanowires. Such discussion is non-limiting and is provided for the sake of clarity. In other embodiments, fractional quantum Hall systems such as 5/2 quantum Hall systems and other systems may be employed.

Illustrative Topological Qubit Array

Figure 1:
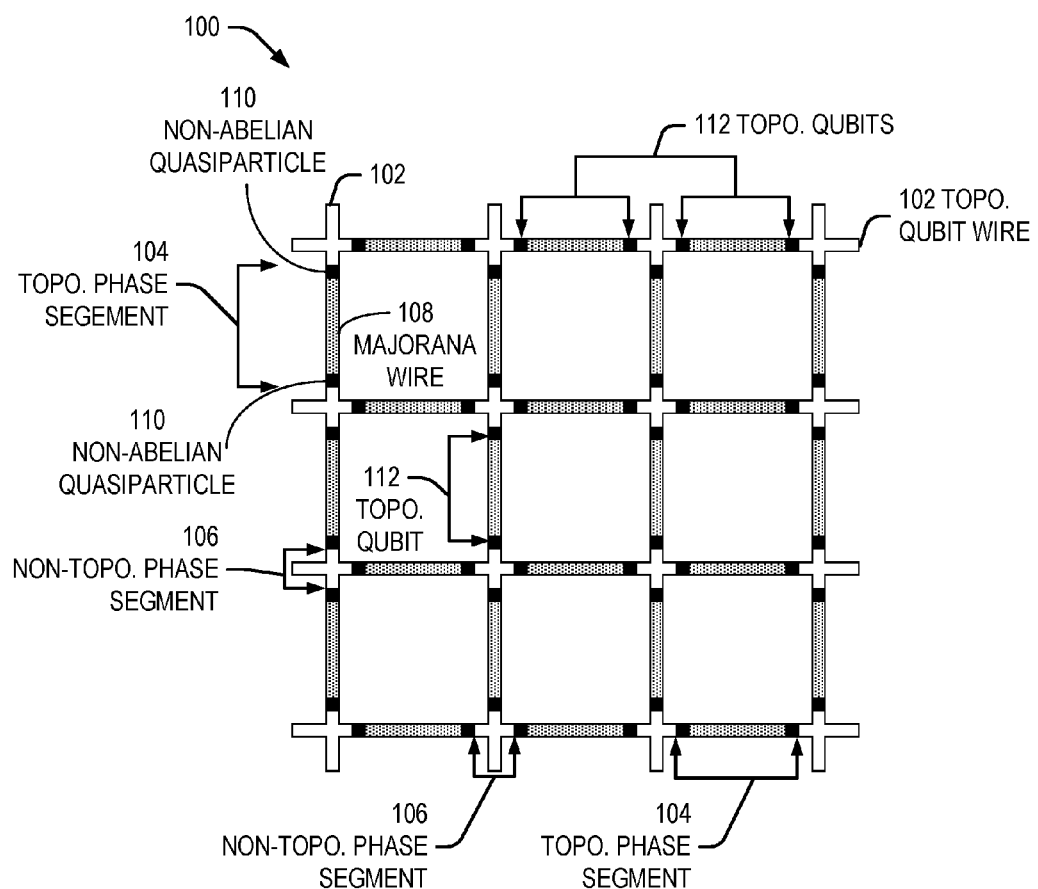
FIG. 1 is a schematic diagram of an example topological qubit array.

FIG. 1 is a schematic diagram of an example topological qubit array 100. The topological qubit array 100 includes an array of topological qubit-wires 102.

A topological qubit-wire 102 includes one or more topological phase segments 104, which are also referred to as Majorana segments, and non-topological phase segments 106. For the purposes of this disclosure a topological phase segment is defined as being in a topological superconducting phase with Majorana modes. In some instances, the Majorana modes may be unpaired zero-energy or low-energy localized at opposed ends of the segment. In some instances, the Majorana modes may be paired (e.g., they may be entangled or may have an interaction).

In some embodiments, the non-topological phase segments 106 can be induced to change into Majorana segments 104 and vice-versa. For example, an electric potential may be applied to a portion of a non-topological phase segment 106 to change the chemical potential in the portion of the non-topological phase segment 106, and the change in the chemical potential may then cause the portion to enter the topological superconducting phase of a Majorana segment. However, in other embodiments, the non-topological phase segments 106 may not be induced, and/or are not inducible, to change into Majorana segments 104.

A Majorana segment 104 has length of Majorana wire 108 and may, in some instances, have unpaired non-Abelian quasiparticles 110 localized at opposite ends of the Majorana wire 108. The non-Abelian quasiparticles 110 may be Majorana quasiparticles.

In some instances, a Majorana segment 104 may have a pair of "ancillary quasiparticles" that may be utilized in teleporting state information from one non-Abelian quasiparticle 110 to another non-Abelian quasiparticle 110. The "ancillary quasiparticles" may be entangled and/or in a preferred fusion channel and may be non-Abelian quasiparticles (e.g., Majorana quasiparticles or non-Abelian anyons).

A topological qubit 112 may be comprised of two or more non-Abelian quasiparticles 110. Calculations may be performed by placing the topological qubits 112 in an initial state, evolving the topological qubits 112 such as by generating exchange transformations of two or more of the non-Abelian quasiparticles 110, and determining a final state of the topological qubits 112.

Figure 2:
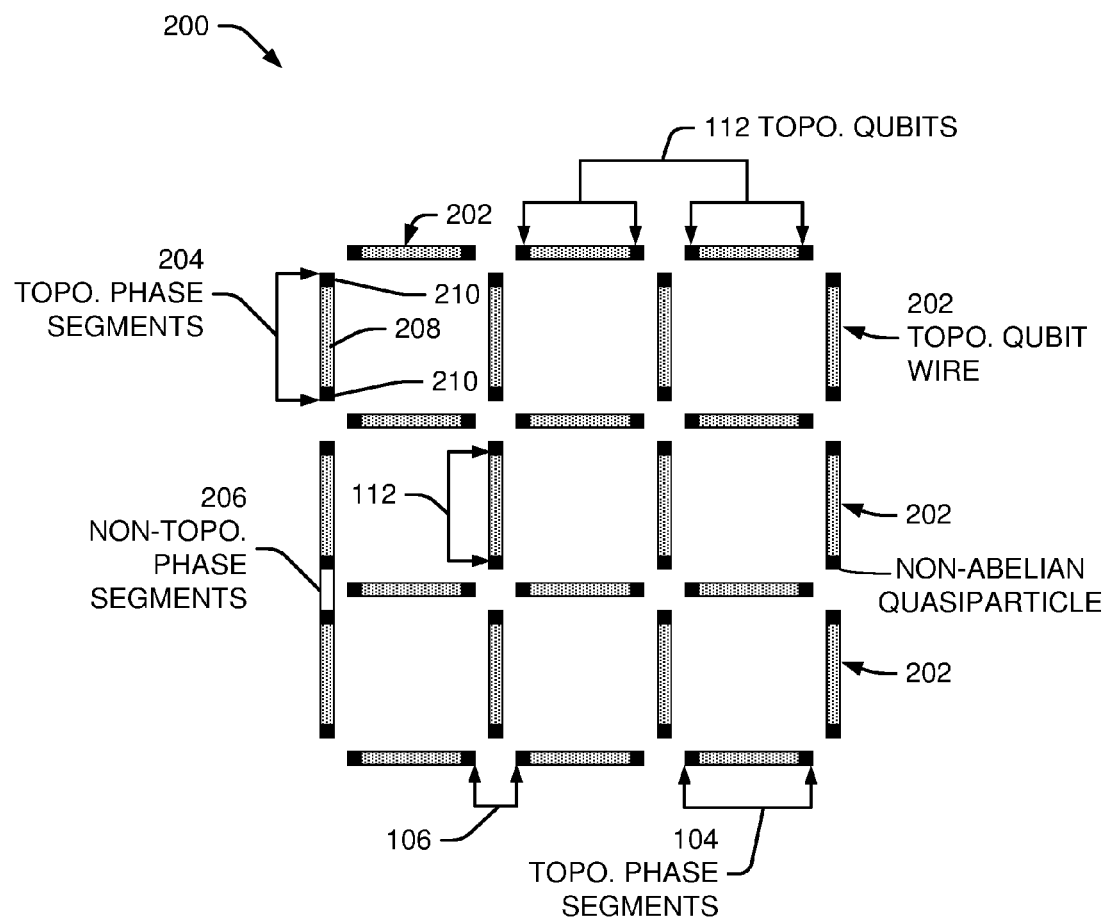
FIG. 2 is a schematic diagram of another example topological qubit array.

FIG. 2 is a schematic diagram of an example topological qubit array 200. The topological qubit array 200 includes an array of topological qubit-wires 202. Each topological qubit-wire 202 includes one or more topological phase segments 204, which are also referred to as Majorana segments. Some, but not necessarily all, topological qubit-wires 202 may be connected by a non-topological phase segment 206 to other topological qubit-wires 202.

Each Majorana segment 204 has length of Majorana wire 208 and may, in some instances, have unpaired non-Abelian quasiparticles 210 localized at opposite ends of the Majorana wire 208. The non-Abelian quasiparticles 210 may be Majorana quasiparticles.

In some instances, a Majorana segment 204 may have a pair of "ancillary quasiparticles" that may be utilized in teleporting state information from one non-Abelian quasiparticle 210 to another non-Abelian quasiparticle 210. The "ancillary quasiparticles" may be entangled and/or be in a preferred fusion channel and may be non-Abelian quasiparticles (e.g., Majorana quasiparticles or non-Abelian anyons).

Illustrative Examples of Topological Qubit-Wire

Figure 3:
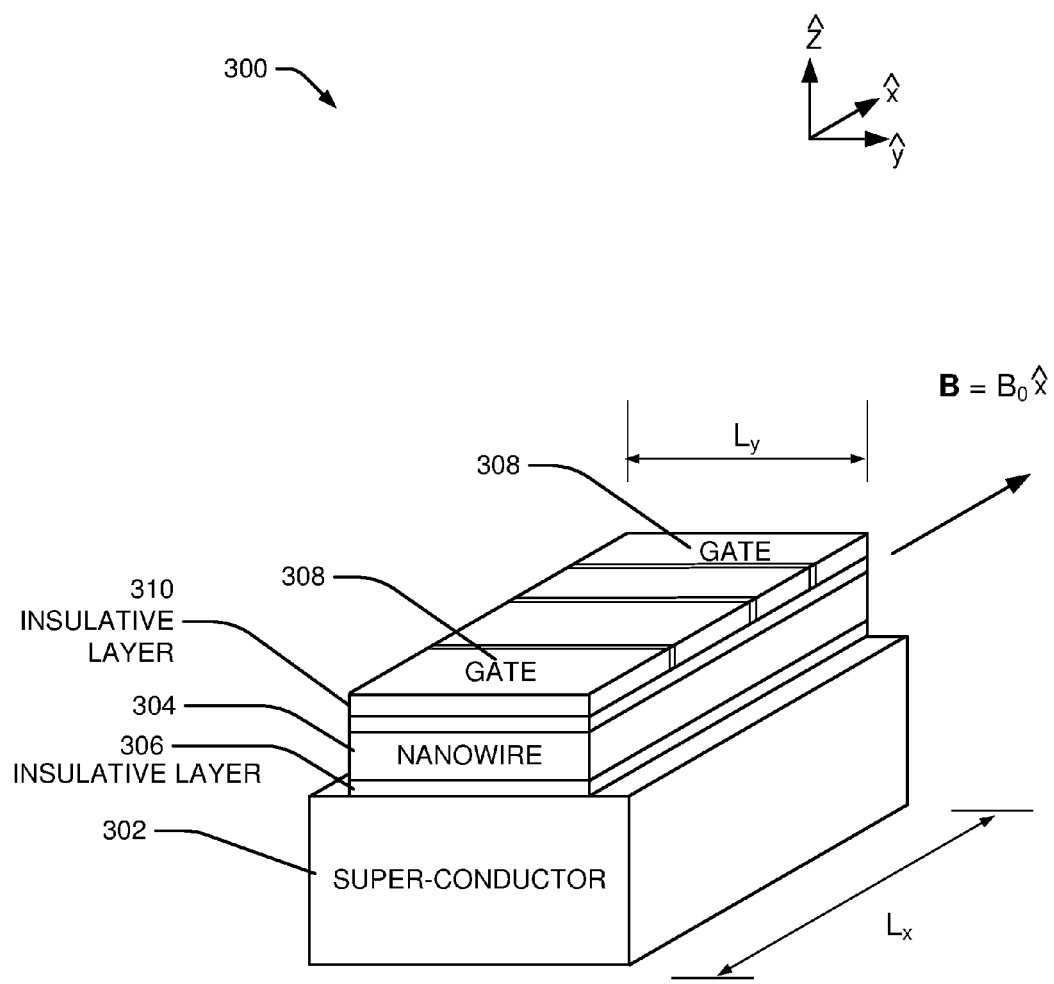
FIG. 3 is schematic diagram of an example topological qubit wire.

FIG. 3 shows a schematic of an example topological qubit-wire 300 that may be implemented in the topological qubit array 100, 200.

The topological qubit-wire 300 includes a superconductor 302 and a nanowire 304. The superconductor 302 may be an s-wave superconductor such as aluminum (Al) or nobium (Nb).

The nanowire 304 may be a 1D semiconductor wire or a quasi-1D semiconductor wire having multi-modes and having a length ($L_x$), a width ($L_y$) and a thickness ($L_z$), where the width is larger than the thickness and the length is larger than the width. For example, the width may be in the range of 50-200 nanometers (nm), the thickness may be in the range of 1-10 nm, and the length may be in the order of microns ($\mu$m). In one embodiment, the length may be between 5-10 $\mu$m, the width may be approximately 130 nm, and the thickness may be approximately 5 nm. The nanowire 304 may be a multi-mode/quasi-1D semiconductor wire due to it being strongly confined in the z-direction, by its thickness, so that only the lowest sub-band is occupied, while the weaker confinement in the y-direction, by its width, provides a few occupied sub-bands.

The nanowire 304 may be a semiconductor such as indium antimonide (InSb) or Indium arsenide (InAs) and may be epitaxially grown. The nanowire 304 may have a large spin-orbit interaction strength $\alpha$ and may have a large Lande g-factor (e.g., $g_{InAs}$:10-25 and $g_{InSb}$:20-70). Furthermore, the nanowire 304 may be of a material (e.g., InSb or InAs) that forms interfaces that are highly transparent for electrons, thereby allowing one to induce a large superconducting gap $\Delta$.

With an in-plane magnetic field, $\vec{B}=B_0\hat{x}$, the superconductor 302 and the nanowire 304 have a strong Rashba coupling, and in the superconductor-semiconductor heterostructure of the topological qubit-wire 300, the Majorana mode may exist as a zero-energy (or low-energy) state.

An insulative layer 306 may interpose the superconductor 302 and the nanowire 304. The insulative layer 306 may be insulative with respect to electric field, magnetic field, etc. Quantum tunneling of electrons, between the superconductor 302 and the multi-mode nanowire 304, occurs through the insulative layer 306.

In some embodiments, the topological qubit-wire 300 may include a top array of gates 308 positioned proximal to a surface of the multi-mode nanowire 304. A second insulative layer 310 may interpose the top array of gates 308 and the nanowire 304. The array of gates 308 may selectively provide an electric field to the nanowire 304 to induce changes to the chemical potential of the nanowire 304, and thereby change portions of the nanowire 304 between topological phase (i.e., having Majorana modes) and non-topological phase (i.e., having no Majorana modes).

Illustrative Non-Abelian Quasiparticle State Teleporter

Figure 4:
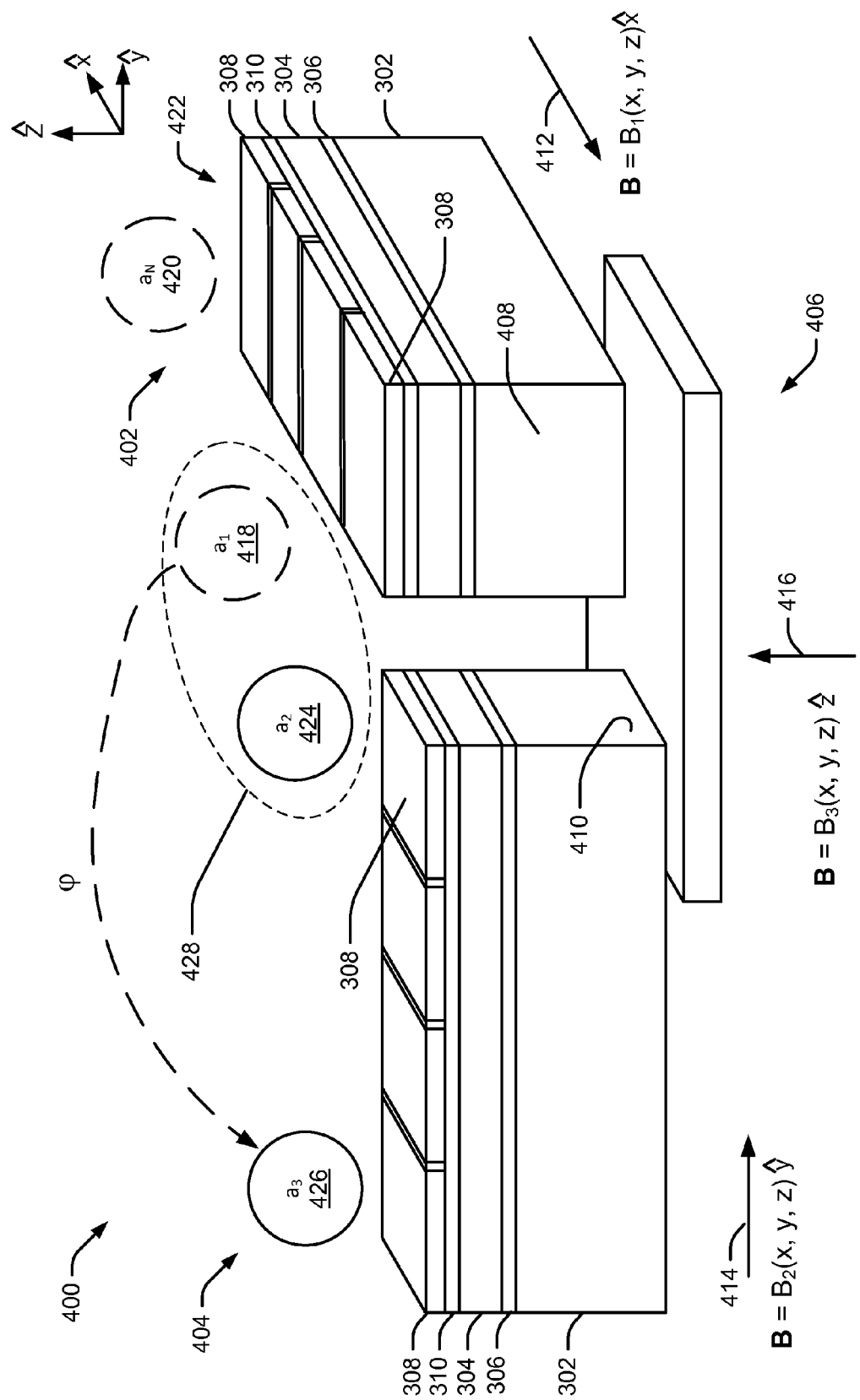
FIG. 4 is a schematic diagram of a schematic of an example non-Abelian quasiparticle state teleporter.

FIG. 4 shows a schematic of an example non-Abelian quasiparticle state teleporter 400 that may implemented in the topological qubit array 100, 200. In this illustrated embodiment, the non-Abelian quasiparticle state teleporter 400 is illustrated and discussed as having the topological qubit-wire 300. However, such discussion is non-limiting and is included to provide a concrete and clear example. In other embodiments, the non-Abelian quasiparticle state teleporter 400 may include other quasiparticle devices, networks, and systems such as, for example, fractional quantum Hall devices. In FIG. 4, features with reference numerals in the 300's (i.e., 302-310) correspond to like numbered features discussed in FIG. 3, and in the interest of brevity are not discussed in detail again.

The non-Abelian quasiparticle state teleporter 400 may include a first and a second topological qubit-wire 402 and 404, respectively, and a tunable quasiparticle interactor 406.

The topological qubit-wire 402 has an end 408 that is proximal to an end 410 of the topological qubit-wire 404. The ends 408 and 410 are proximal to, or within a zone of coverage of, the tunable quasiparticle interactor 406. The tunable quasiparticle interactor 406 may include one or more gates and/or one or more magnetic field sources and/or other components that influence the topological behavior of the topological qubit wires 402 and 404 at or near the ends 408 and 410. The tunable quasiparticle interactor 406 may influence the topological behavior of the topological qubit wires 402 and 404 at or near the ends 408 and 410 adiabatically.

The quasiparticle interactor 406 may alter, in the topological qubit wires 402 and 404 at or near the ends 408 and 410, one or more of: local-chemical potential; local-Zeeman splitting; local-superconductor energy gap; and local-magnetic fields. The quasiparticle interactor 406 may also include components such as interferometers that may drive a pair of quasiparticles into a desired fusion channel.

For example, the topological qubit-wire 402 may have a longitudinal length aligned in the x-direction topological, and the qubit-wire 404 may have a longitudinal length aligned in the y-direction. A magnetic field, $B_1$, 412 may be applied to the topological qubit-wire 402 along its longitudinal axis, and a magnetic field, $B_2$, 414 may be applied to the topological qubit-wire 404 along its longitudinal axis. The magnetic field 412 (414) may produce Zeeman splitting of electrons in the respective superconductors 208 of the topological qubit-wires 402 (404), and Zeeman splitting may be a controllable parameter for inducing quasiparticles, such as non-Abelian quasiparticles, in the topological qubit-wire 402 (404). The tunable quasiparticle interactor 406 may provide a magnetic field, $B_3$, 416 to ends 408 and 410. The magnetic field, $B_3$, 416 may influence the topological behavior of the topological qubit wires 402 and 404 at or near the ends 408 and 410.

FIG. 4 shows the topological qubit-wire 402 having a pair of non-Abelian quasiparticles $a_1$ 418 and $a_N$ 420 localized at end 408 and 422, respectively, of the nanowire 304 of the topological qubit-wire 402. The non-Abelian quasiparticles $a_1$ 418 and $a_N$ 420 may be unpaired Majorana zero energy modes. The non-Abelian quasiparticle $a_1$ 418 has state information ($\phi$) that is to be teleported, but the non-Abelian quasiparticle $a_N$ 420 is not involved in the teleportation. It is included in the figure and discussion merely because Majorana quasiparticles are created in pairs.

The topological qubit-wire 404 has a pair of a non-Abelian quasiparticles $a_2$ 424 and $a_3$ 426, which may be initially entangled, or in a predetermine fusion channel, or otherwise have some interaction/pairing. The quasiparticle interactor 406 may have initialized the non-Abelian quasiparticles $a_2$ 424 and $a_3$ 426 into a desired interaction, desired phase, desired fusion channel, etc. In some instances, the non-Abelian quasiparticles $a_2$ 424 and $a_3$ 426 may be paired Majorana quasiparticles and may be in a trivial phase or trivial fusion channel.

The tunable quasiparticle interactor 406 cause an interaction 428 between the non-Abelian quasiparticles $a_1$ 418 and $a_2$ 424. The interaction 428 may be applied adiabatically. At some stage, the interaction 428 becomes strong enough to teleport the state information ($\phi$) from non-Abelian quasiparticle $a_1$ 418 to non-Abelian quasiparticle $a_3$ 426. It is important to realize that the non-Abelian quasiparticle $a_1$ 418 has not been physically moved and that the non-Abelian quasiparticle $a_1$ 418 remains at the end 408 of the topological qubit-wire 402.

B: General Discussion of Anyonic Teleportation and Braiding Transformations via Tunable Interactions This section includes subsections which describe: generating forced measurements using tunable interactions; anyonic teleportation; generating braiding transformations; Ising Anyons and Majorana Fermion Zero Modes; and Majorana Wires.

Generating Forced Measurements Using Tunable Interactions

This section demonstrates how adiabatic manipulation of interactions between anyons may be used to implement certain topological charge projection operators, such as those used for anyonic teleportation and MOTQC. This can be done by restricting one's attention to three non-Abelian anyons that carry charges $a_1$, $a_2$, and $a_3$, respectively, and have definite collective topological charge c, which is non-Abelian. The internal fusion state space of these three anyons is $V_c^{a_1 a_2 a_3} \cong \oplus_e V_e^{a_1 a_2} \otimes V_c^{e a_3} \cong \oplus_f V_c^{a_1 f} \otimes V_f^{a_2 a_3}$.

Consider a time-dependent Hamiltonian H(t) with the following properties:

1. $H(0)=V^{(23)}$ is an interaction involving only anyons $a_2$ and $a_3$, for which the ground states have definite topological charge value $b_{23}$ for the fusion channel of anyons $a_2$ and $a_3$ (i.e. they are eigenstates of the projector $\Pi_{b_{23}}^{(23)}$ that survive projection) and there is an energy gap to states with other topological charge values of this fusion channel.

2. $H(\tau)=V^{(12)}$ is an interaction involving only anyons $a_1$ and $a_2$, for which the ground states have definite topological charge value $b_{12}$ for the fusion channel of anyons $a_1$ and $a_2$ (i.e. they are eigenstates of the projector $\Pi_{b_{12}}^{(12)}$ survive projection) and there is an energy gap to states with other topological charge values of this fusion channel.

3. H(t) is an interaction involving only anyons $a_1$, $a_2$, and $a_3$, which adiabatically connects H(0) and H($\tau$), without closing the gap between the ground states and the higher energy states, during $0 \leq t \leq \tau$.

In other words, the ground state subspace of H(t) corresponds to a one-dimensional subspace of $V_c^{a_1 a_2 a_3}$ for all $0 \leq t \leq \tau$, where this subspace is $V_c^{a_1 b_{23}} \otimes V_{b_{23}}^{a_2 a_3}$ at t=0 and $V_{b_{12}}^{a_1 a_2} \otimes V_c^{b_{12} a_3}$ at t=$\tau$. It should be emphasized that, even though the internal fusion channel degeneracy of anyons $a_1$, $a_2$, and $a_3$ is broken, H(t) may still exhibit ground state degeneracy due to the any other anyons in the system, since it acts trivially upon them. Also, since H(t) is an interaction involving only anyons $a_1$, $a_2$, and $a_3$, it cannot change their collective topological charge c.

It is now easy to apply the adiabatic theorem to determine the result of (unitary) time evolution on the ground state subspace. The adiabatic theorem states that if the system is in an energy eigenstate and it goes through an adiabatic process which does not close the gap between the corresponding instantaneous energy eigenvalue and the rest of the Hamiltonian's spectrum, then the system will remain in the subspace corresponding to this instantaneous energy eigenvalue. Since the Hamiltonian only acts nontrivially on anyons $a_1$, $a_2$, and $a_3$, and a ground state will stay in the instantaneous ground state subspace, the resulting ground state evolution operator $U_0(t)$ [i.e., the restriction of the time evolution operator U(t) to the ground state subspace] at time t=$\tau$ must be $$U_0(\tau) = e^{i\theta}([F_c^{a_1 a_2 a_3}]^*_{b_{12} b_{23}})^{-1} \Pi_{b_{12}}^{(12)} \Pi_c^{(123)} \Pi_{b_{23}}^{(23)} \quad (1)$$

$$= e^{i\theta} |a_1, a_2; b_{12}\rangle |b_{12}, a_3; c\rangle \langle a_1, b_{23}; c| \langle a_2, a_3; b_{23}|$$

$$= e^{i\theta} \sqrt{\frac{d_c}{d_{a_1} d_{a_2} d_{a_3}}}$$

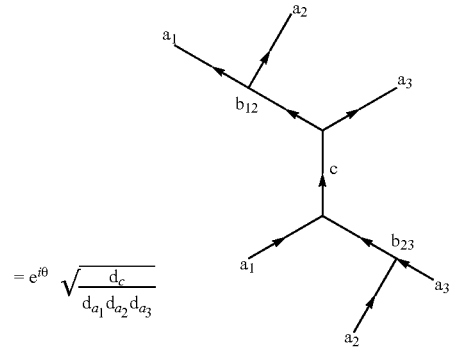

where the factor $[F_c^{a_1a_2a_3}]^*_{b_{12}b_{23}}$ is necessary to ensure that the operator is unitary. The (unimportant) overall phase $e^{i\theta}$ is the product of the dynamical phase and the Berry's phase. It should be noted that $\Pi_c^{(123)}$ commutes with $\Pi_{b_{12}}^{(12)}$ and $\Pi_{b_{23}}^{(23)}$.

Thus, it is clear that applying the operator $U_0(\tau)$ to states in the t=0 ground state subspace has the same effect, up to an unimportant overall phase, as does applying the projection operator $\Pi_{b_{12}}^{(12)}$ and dividing by the (state-independent) renormalizing factor $[F_c^{a_1a_2a_3}]^*_{b_{12}b_{23}}$. In other words, the effect of time evolution (from t=0 to $\tau$) under this adiabatic process on a t=0 ground state is exactly the same as the effect of performing a projective topological charge measurement of the collective charge of anyons $a_1$ and $a_2$ with predetermined measurement outcome $b_{12}$. Operationally, this is identical to the "forced measurement" protocol (meaning it generates the same operator acting on the state space), which allows one to effectively perform a topological charge measurement with predetermined measurement outcome (in certain situations). The adiabatic evolution of ground states includes an implicit continual projection into the instantaneous ground state subspace and can be thought of as the continuum limit of a series of measurements, with the final measurement being a projection into the final ground state subspace.

It is always possible to write a Hamiltonian H(t) that satisfies the enumerated properties 1-3, since one can write a projector $\Pi_0(t)$ onto a one-dimensional subspace of $V_c^{a_1a_2a_3}$ that interpolates between the initial and final ground state subspaces, such as $$\Pi_0(t) = \left(\frac{t}{\tau}\right)^2 \Pi_{b_{12}}^{(12)}\Pi_c^{(123)}\Pi_{b_{12}}^{(12)} + \left(\frac{t}{\tau}\right)\left(1-\frac{t}{\tau}\right) \times |a_1, a_2; b_{12}\rangle|b_{12}, a_3; c\rangle \quad (2)$$
$$\langle a_1, b_{23}; c|\langle a_2, a_3; b_{23}| + |a_2, a_3; b_{23}\rangle|a_1, b_{23}; c\rangle$$
$$\langle b_{12}, a_3; c|\langle a_1, a_2; b_{12}|) + \left(1-\frac{t}{\tau}\right)^2 \Pi_{b_{23}}^{(23)}\Pi_c^{(123)}\Pi_{b_{23}}^{(23)}.$$

However, it is worth considering Hamiltonians that are physically more natural and amenable to experimental implementation. A simple and natural suggestion is to use the linear interpolation $$H(t) = \left(\frac{t}{\tau}\right) V^{(12)} + \left(1-\frac{t}{\tau}\right) V^{(23)}. \quad (3)$$

This Hamiltonian automatically satisfies properties 1 and 2. However, it is complicated to determine whether it also satisfies property 3 for general pairwise interactions $V^{(12)}$ and $V^{(23)}$ (unless $v_c^{a_1a_2a_3}$ is two-dimensional). In the simple (but non-generic) case where the interactions are given by $$V^{(jk)} = \epsilon_{jk}[1 - 2\Pi_{b_{jk}}^{(jk)}] \quad (4)$$

with $\epsilon_{jk} > 0$, property 3 will be satisfied iff $[F_c^{a_1a_2a_3}]_{b_{12}b_{23}} \neq 0$ (which ensures that the projectors $\Pi_{b_{jk}}^{(jk)}$ are not orthogonal). It is expected (though have not shown) that property 3 will also be satisfied for general interactions if $[F_c^{a_1a_2a_3}]_{b_{12}b_{23}} \neq 0$. For the cases of greatest physical interest, property 3 is satisfied for arbitrary nontrivial pairwise interactions, because their state spaces $v_c^{a_1a_2a_3}$ are two-dimensional [and so reduce to the case in Eq. (15)] and have $[F_c^{a_1a_2a_3}]_{b_{12}b_{23}} \neq 0$.

Anyonic Teleportation

For anyonic teleportation, one considers an anyonic state $\Psi$ partially encoded in anyon $a_1$ and an ancillary pair of anyons $a_2$ and $a_3$, which serve as the entanglement resource. The ancillary anyons are initially in a state with definite fusion channel $b_{23}$ (which must be linked to other anyons, which is denoted $\mathcal{A}$, if $b_{23} \neq I$, where I is the trivial (or vacuum) fusion channel. (When two Ising anyons fuse, the result can be either the trivial state (I) or another quasiparticle excitation ($\psi$), as indicated by the fusion rule: $\sigma \times \sigma = I + \psi$.) The combined initial state is written diagrammatically as

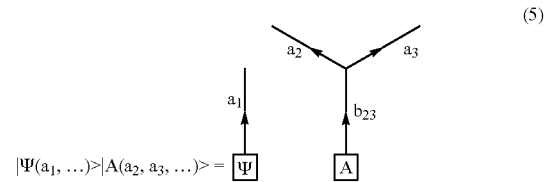

(5)

where the boxes are used to indicate the encoding details of the states, including other anyons (denoted as " . . . ") that comprise them.

To teleport the state information encoded in anyon $a_1$ to anyon $a_3$, one applies a projector $\Pi_{b_{12}}^{(12)}$ to the combined state (and renormalizes), at which point anyons $a_1$ and $a_2$ become an ancillary pair. It must further be required that $b_{12}$ and $b_{23}$ are Abelian charges, otherwise it will not be possible to dissociate the state information from the "ancillary" anyons. In this case, $a_1 = b_{12} \times \bar{a}_2$, $a_3 = b_{23} \times \bar{a}_2$, $c = b_{12} \times b_{23} \times \bar{a}_2$, and $d_{a_1} = d_{a_2} = d_{a_3} = d_c$. The post-projected state is (6)

$$([F_c^{a_1a_2a_3}]^*_{b_{12}b_{23}})^{-1} \Pi_{b_{12}}^{(12)} |\Psi(a_1, \ldots)\rangle |A(a_2, a_3, \ldots)\rangle$$

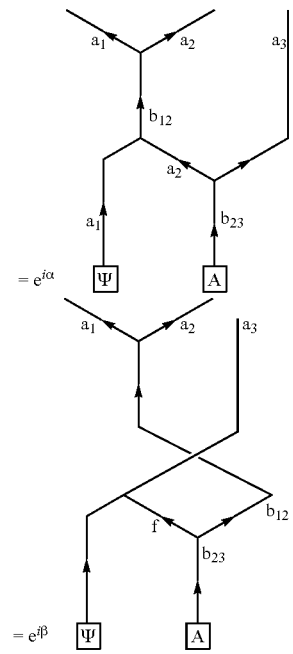

where $e^{i\alpha}$ and $e^{i\beta}$ are unimportant phases (that are straightforward to compute) and $f = \bar{b}_{12} \times b_{23}$ is an Abelian charge. While it may at first appear that there is still anyonic entanglement between the topological state encoded in anyon $a_3$ and the ancillary anyons $a_1$ and $a_2$, it should be emphasized that this is not actually the case. Specifically, the charge line f does not result in any nontrivial anyonic entanglement, because f is Abelian. One must simply keep track of this Abelian charge f as a modification to subsequent readouts, but it does not alter the encoded information. [It is, of course, more clear when $b_{12}=b_{23}$, and hence f=I, to see that there is no anyonic entanglement associated with this charge line, since then the final state can be written as $|\Psi (a_3, \ldots )\rangle |\mathcal{A}(a_1, a_2, \ldots )\rangle$.] The braiding between the $a_3$ and $b_{12}$ charge lines does not change state information (and can also be replaced with a clockwise, rather than counter-clockwise braiding), since $b_{12}$ is Abelian, and so the braiding can only contribute an overall phase. Thus, in this post-projected state, the anyonic state $\Psi$ is partially encoded in anyon $a_3$ (up to some Abelian factors), while anyons $a_1$ and $a_2$ form an ancillary pair that is uncorrelated with $\Psi$, so this is an anyonic teleportation.

Figure 5:
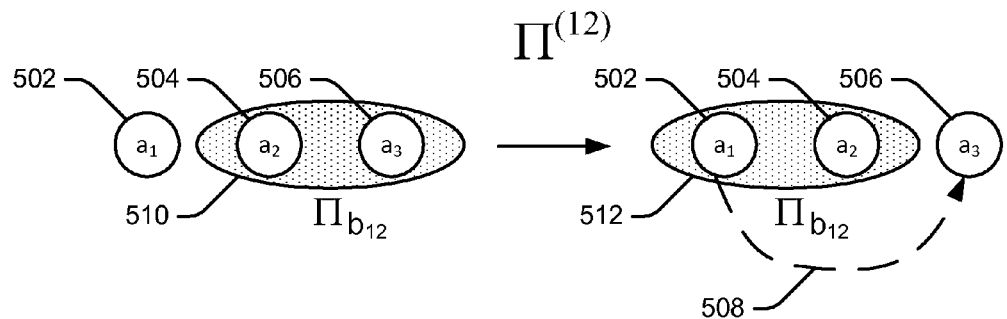
FIG. 5 is a schematic diagram of an example projection operator.

Referring to FIG. 5, for an anyonic state initially encoded in anyon $a_1$ 502 and an ancillary pair of anyons $a_2$ 504 and $a_3$ 506 in an Abelian fusion channel $b_{23}$, application of a topological charge projector $\Pi_{b_{12}}^{(12)}$, with $b_{12}$ Abelian, teleports the anyonic state information from anyon $a_1$ 502 to anyon $a_3$ 506, as indicated by the dashed arrow 508. Topological charge projectors (corresponding to measurements or interactions) are indicated by ovals. Initially, the ancillary pair of anyons $a_2$ 504 and $a_3$ 506 are projected, as indicated by the oval 510. After the application of the topological charge projector $\Pi_{b_{12}}^{(12)}$ anyon $a_1$ 502 and anyon $a_2$ 504 are projected, as indicated by the oval 512. The topological charge projector $\Pi_{b_{12}}^{(12)}$ may be generated via interactions and/or measurements.

Anyonic Braiding Transformations

Figure 6:
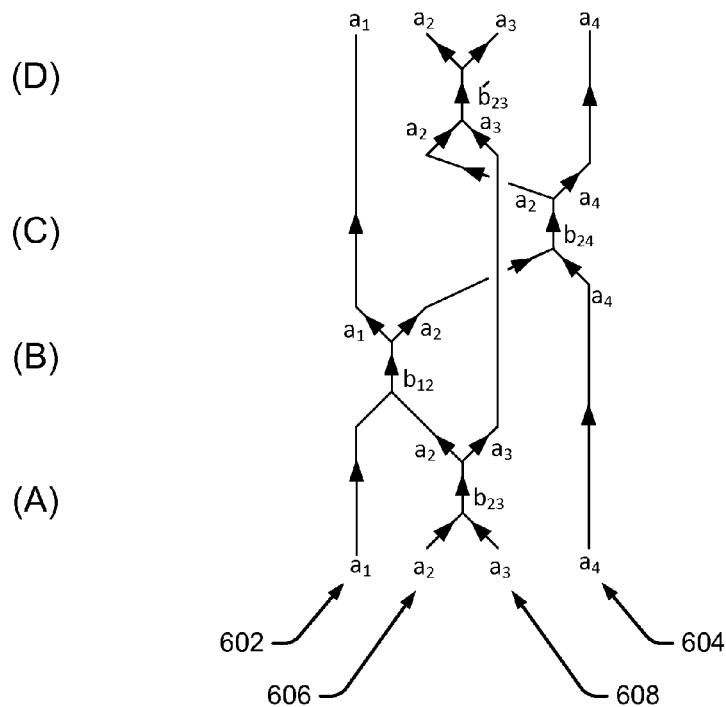
FIG. 6 is a schematic diagram of an example series of projection operators that generates an anyonic braiding transformation.

Referring to FIG. 6, an anyonic state initially encoded in anyon $a_1$ 602 and anyon $a_4$ 604 is acted upon with a series of topological charge projection operators that generates a braiding transformation for these anyons. The braiding transformation for anyons $a_1$ 602 and $a_4$ 604 is implemented with an ancillary pair of anyons $a_2$ 606 and $a_3$ 608. At step (a), anyons $a_2$ 606 and $a_3$ 608 are initialized in the fusion channel $b_{23}$ (e.g. by applying a projector). Then a series of pairwise topological charge projections (generated by performing measurements or forced measurements, or using interactions) are applied: step (b), anyons $a_1$ 602 and $a_2$ 606 are projected into the fusion channel $b_{12}$; step (c), anyons $a_2$ 606 and $a_4$ 604 are projected into the fusion channel $b_{24}$; and step (d), anyons $a_2$ 606 and $a_3$ 608 are projected into the fusion channel $b'_{23}$. The configuration of the anyons and pairwise projections is shown in FIGS. 7A-7C.

Figure 7A:
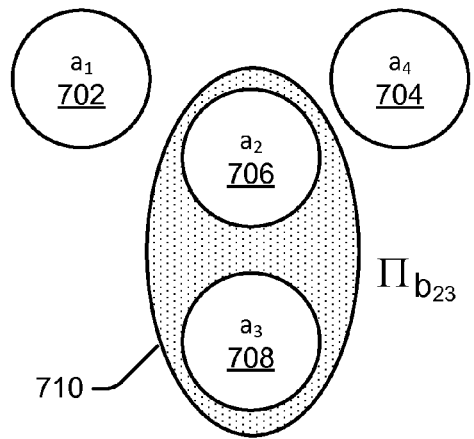
FIGS. 7A-7C are schematic diagrams of example projection operators.
Figure 7B:
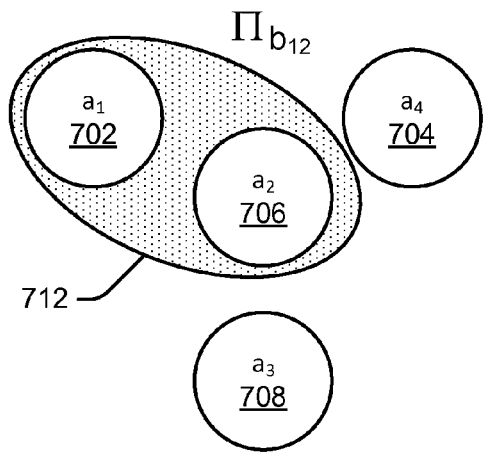
Figure 7C:
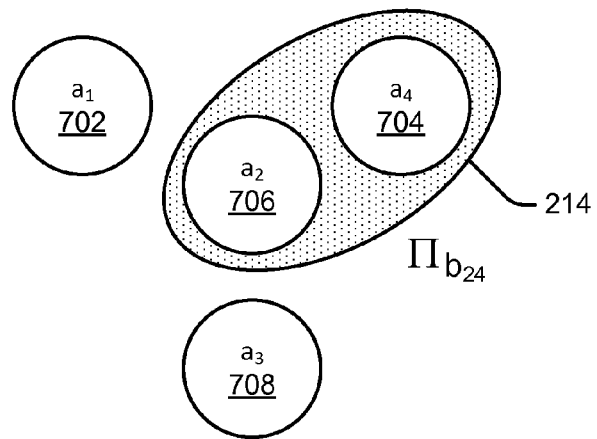

The collective topological charge projectors of pairs of anyons $a_2$ 706 and $a_3$ 708, $a_1$ 702 and $a_2$ 706, and $a_2$ 706 and $a_4$ 704 are shown in FIGS. 7A-7C, respectively. Anyons $a_2$ 706 and $a_3$ 708 are coupled by topological charge projector $\Pi_{b_{23}}^{(23)}$ 710 (see FIG. 7A). Anyons $a_1$ 702 and $a_2$ 706 are coupled by topological charge projector $\Pi_{b_{12}}^{(12)}$ 712 (see FIG. 7B), and anyons $a_2$ 706 and $a_4$ 704 are coupled by topological charge projector $\Pi_{b_{24}}^{(24)}$ 714 (see FIG. 7C).

The resulting operator is obtained by taking the product of projectors (and dividing by a normalization factor)

$$X = C\, \Pi_{b'_{23}}^{(23)} \Pi_{b_{24}}^{(24)} \Pi_{b_{12}}^{(12)} \Pi_{b_{23}}^{(23)} \quad (7)$$

where C is a constant that gives the proper normalization.

Referring to FIG. 6, it is, again, necessary to require $b_{12}$, $b_{23}$, $b'_{23}$, and $b_{24}$ to be Abelian charges. Otherwise, it would not be possible to ensure that the collective topological charge of each 3-tuple of anyons involved in each teleportation step has definite value ($c_{123}$, $c_{124}$, and $c_{234}$, respectively), which is necessary to apply the results of Sec. 3, and to ensure that the resulting operator is unitary. Moreover, if either $b_{23}$ or $b'_{23}$ is non-Abelian, it will not be possible to dissociate the operation on anyons $a_1$ and $a_4$ from the "ancillary" anyons $a_2$ and $a_3$.

It is useful (and often natural), though not necessary, to also have $b_{23}=b'_{23}$, otherwise there will be an Abelian charge line $f=b_{23}\times \bar{b}'_{23}$ connecting the ancillary anyons to the operator, which makes the situation slightly more complicated (though still manageable). Focusing on this case, one finds that $a_1=b_{12}\times \bar{a}_2$, $a_4=b_{24}\times \bar{a}_2$, and the $b_{23}=b'_{23}$ charge lines can be recoupled and fully dissociated from the operation on anyons $a_1$ and $a_4$, so that the operator takes the form $$X = \hat{X}^{(14)} \otimes \Pi_{b_{23}}^{(23)}, \quad (8)$$

where the operator on anyons $a_1$ and $a_4$ is $$ \quad (9)$$

$$\hat{X}^{(14)} = e^{i\phi}\ a_1 \overset{\bar{a}_2}{\diagdown}\!\!\!\diagup \overset{\bar{a}_2}{\diagup}\!\!\!\diagdown a_4 \quad (10)$$

$$= e^{i\phi'}\ a_1 \diagdown\!\!\diagup g \diagup\!\!\diagdown a_4 \quad (11)$$

$$= e^{i\phi''} \sum_c [F_c^{a_4 g a_4}]_{a_1 a_1}\, R_c^{a_4 a_1}\, \Pi_c^{(14)} \quad $$

$$= e^{i\phi} \sum_c R_{\bar{c}}^{\bar{a}_2 \bar{a}_2}\, \Pi_c^{(14)} \quad (12)$$

where $g=b_{12}\times \bar{b}_{24}$, $\hat{c}=c\times \bar{b}_{12}\times \bar{b}_{24}$, and $e^{i\phi}$, $e^{i\phi'}$, and $e^{i\phi''}$ are unimportant overall phase factors (which may depend on $b_{12}$ and $b_{24}$).

It should be clear that $\hat{X}^{(14)}$ is a modified braiding transformation, with the precise modification depending on $a_j$, $b_{12}$, and $b_{24}$. Furthermore, if $b_{12}=b_{24}$, then $g=0$ and $\hat{X}^{(14)}=e^{i\phi''}R_{a_1 a_4}$ is exactly equal to the usual braiding transformation (up to an unimportant overall phase) obtained by exchanging anyons $a_1$ and $a_4$ in a counterclockwise fashion.

Ising Anyons and Majorana Fermion Zero Modes

In this section, the above results are discussed in more detail for Ising anyons, because they are an especially physically relevant example. Ising-type anyons occur as quasiparticles in a number of quantum Hall states that are strong candidates for describing experimentally observed quantum Hall plateaus in the second Landau level, most notably for the $$\nu = \frac{5}{2}$$

plateau, which has experimental evidence favoring a non-Abelian state. Ising anyons also describe the Majorana fermion zero modes, which exist in vortex cores of two-dimensional (2D) chiral p-wave superfluids and superconductors, at the ends of Majorana nanowires (one-dimensional spinless, p-wave superconductors), and quasiparticles in various proposed superconductor heterostructures. (Since there are always interactions that may lead to energy splitting, it is more accurate to call these "Majorana $\epsilon$ modes" where $\epsilon$ goes to zero as $\epsilon = O(e^{-L/\xi})$ for separations L and correlation length $\xi$.) Recently, there have been several experimental efforts to produce Majorana nanowires.

The Ising anyon model is described by:

$$C = \{I, \sigma, \psi\}, I \times a = a \times I = a, \psi \times \psi = I,$$

$$\sigma \times \psi = \psi \times \sigma = \sigma, \sigma \times \sigma = I + \psi$$

$$[F_\sigma^{\sigma\sigma\sigma}]_{ef} = \begin{bmatrix} \frac{1}{\sqrt{2}} & \frac{1}{\sqrt{2}} \\ \frac{1}{\sqrt{2}} & \frac{-1}{\sqrt{2}} \end{bmatrix}_{ef} [F_\psi^{\sigma\psi\sigma}]_{\sigma\sigma} = [F_\sigma^{\psi\sigma\psi}]_{\sigma\sigma} = -1$$

$$R_I^{\sigma\sigma} = e^{-i\frac{\pi}{8}}, R_\psi^{\sigma\sigma} = e^{i\frac{3\pi}{8}}, R_\sigma^{\sigma\psi} = R_\sigma^{\psi\sigma} = -i, R_I^{\psi\psi} = -1$$

$$R_I^{\sigma\sigma} = e^{-i\frac{\pi}{8}}, R_\psi^{\sigma\sigma} = e^{i\frac{3\pi}{8}}, R_\sigma^{\sigma\psi} = R_\sigma^{\psi\sigma} = -i, R_I^{\psi\psi} = -1$$

where e, f$\in\{I, \psi\}$, and only the non-trivial F-symbols and R-symbols are listed. (F-symbols and R-symbols not listed are equal to 1 if their vertices are permitted by the fusion algebra, and equal to 0 if they are not permitted.) The topological charge $\psi$ corresponds to a fermion, while $\sigma$ corresponds to a non-Abelian anyon. In Majorana fermion systems, the zero modes correspond to the $\sigma$ anyons. In this way, the fusion rule $\sigma \times \sigma = I + \psi$ indicates that a pair of zero modes combines to a fermion mode, which can either be unoccupied or occupied, corresponding to the I or $\psi$ fusion channel, respectively. The braiding operator for exchanging Majorana zero modes is given by the braiding of the $\sigma$ Ising anyons, up to an overall phase ambiguity.

The braiding transformations of Ising anyons are not, by themselves, computationally universal, as they only generate a subset of the Clifford gates. However, they nonetheless provide a topologically protected gate set that is very useful for quantum information processing and error correction.

For anyonic teleportation, one considers the case where $a_1 = a_2 = a_3 = \sigma$. Then, $b_{12}$, $b_{23}$, and $f = \bar{b}_{12} \times b_{23}$ in Eq. (17) can equal either I or $\psi$. When f=I, there is no charge line connecting the final ancillary pair of anyons $a_1$ and $a_2$, to anyon $a_3$, so the state information that was initially encoded in anyon $a_1$ is teleported to anyon $a_3$, with no modifying factors. When f=$\psi$, the state information is similarly teleported from anyon $a_1$ to $a_3$, but the overall anyonic charge of the encoded state $\Psi$ now has an extra fermionic parity $\psi$ associated with anyon $a_3$, entering through the charge line f. The encoded state information is not altered, but if one is attempting to access the state information through a collective topological charge measurement including anyon $a_3$, then one must remember to factor out this extra fermionic parity when identifying the state's measurement outcome.

For the (modified) braiding transformation generated from measurements or forced measurements, one considers the case when $a_1 = a_2 = a_3 = a_4 = \sigma$. Then, $b_{12}$, $b_{23}$, $b_{24}$, and $g = b_{12} \times \bar{b}_{24}$ in Eqs. (9)-(12) can equal either I or $\psi$, and $\tilde{c} = g \times c$. When g=I, the operator $$\hat{X}^{(14)} = e^{i\phi} R_{\sigma\sigma} \quad (13)$$

is equal to the braiding exchange of the two $\sigma$ anyons in a counterclockwise fashion (apart from an unimportant overall phase $e^{i\phi}$). When g=$\psi$, the operator becomes $$\hat{X}^{(14)} = e^{i\phi'} R_{\sigma\sigma}^{-1}, \quad (14)$$

which is equal to the braiding exchange of the two $\sigma$ anyons in a clockwise fashion (apart from a different unimportant overall phase $e^{i\phi'}$). The modification due to g=$\psi$ effectively reverses the chirality of the braiding exchange.

Majorana Wires

It is useful and interesting to consider the results presented above in the context of Majorana nanowires. In particular, in the discretized model of Majorana nanowires, the translocation and exchange of the Majorana zero modes localized at the ends of wires can be understood as applications of anyonic teleportation and measurement-generated braiding transformation.

Kitaev's N-site fermionic chain model, for a spinless, p-wave superconducting wire is given by the Hamiltonian $$H = -\mu \sum_{j=1}^{N} \left( c_j^\dagger c_j - \frac{1}{2} \right) - \quad (15)$$

$$w \sum_{j=1}^{N-1} \left( c_j^\dagger c_{j+1} + c_{j+1}^\dagger c_j \right) + \sum_{j=1}^{N-1} \left( \Delta c_j c_{j+1} + \Delta^* c_{j+1}^\dagger c_j^\dagger \right),$$

where $\mu$ is the chemical potential, w is the hopping amplitude, $\Delta = |\Delta| e^{i\Theta}$ is the induced superconducting gap, and the jth site has (spinless) fermionic annihilation and creation operators, $c_j$ and $c_j^\dagger$, respectively. This Hamiltonian exhibits two gapped phases (assuming the chain is long, i.e., N>>1):

(a) The trivial phase with a unique ground state occurs for $2|w| < \mu$.

(b) The non-trivial phase with twofold-degenerate ground states and zero modes localized at the endpoints occurs for $2|w| > \mu$ and $\Delta \neq 0$.

A powerful way of understanding this model comes from rewriting the fermionic operator $c_j$ of each site in terms of two Majorana operators.

$$\gamma_{2j-1} = e^{i\frac{\theta}{2}} c_j + e^{-i\frac{\theta}{2}} c_j^\dagger \quad (16)$$

$$\gamma_{2j} = -i e^{i\frac{\theta}{2}} c_j + i e^{-i\frac{\theta}{2}} c_j^\dagger. \quad (17)$$

In this way, the two gapped phases can be qualitatively understood by considering the following special cases inside each phase:

(a) $\mu<0$ and $w=\Delta=0$, for which the Hamiltonian becomes $$H_a = \left( \frac{-\mu}{2} \right) \sum_{j=1}^{N} i\gamma_{2j-1} \gamma_{2j}. \quad (18)$$

(b) $\mu=0$ and $w=|\Delta|>0$, for which the Hamiltonian becomes $$H_b = w \Sigma_{j=1}^{N-1} i\gamma_{2j} \gamma_{2j+1}. \quad (19)$$

Any pair of Majorana operators $\gamma_j$ and $\gamma_k$ can be written as a fermionic operator $$\tilde{c} = \frac{1}{2}(\gamma_j + i\gamma_k),$$

in which case $i\gamma_j\gamma_k = 2\tilde{c}^\dagger \tilde{c} - 1$. Thus, the eigenvalue $-1$ of $i\gamma_j\gamma_k$ corresponds to an unoccupied fermionic state, while the $+1$ eigenvalue corresponds to an occupied fermionic state. In $H_a$, each Majorana operator is paired with the other Majorana operator on the same site, such that the fermionic state at each site is unoccupied in the ground state. In $H_b$, each Majorana operator is paired with a Majorana operator in an adjacent site (such that their corresponding fermionic state is unoccupied in the ground states), except for $\gamma_i$ and $\gamma_{2N}$, which are unpaired (i.e., they do not occur in the expression for $H_b$). These unpaired Majorana operators result in zero modes, which give rise to a twofold degeneracy of ground states corresponding to $i\gamma_1 \gamma_{2N} = \pm 1$.

Figure 8A:
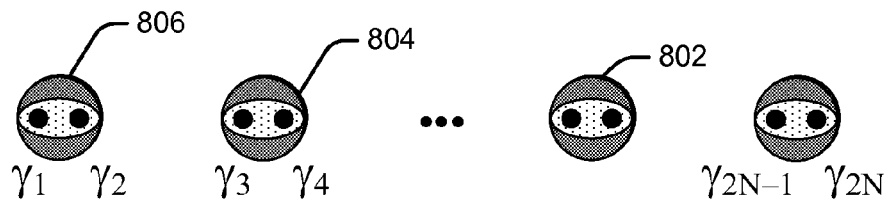
FIGS. 8A and 8B are schematic diagrams of example Majorana quasi particles.
Figure 8B:
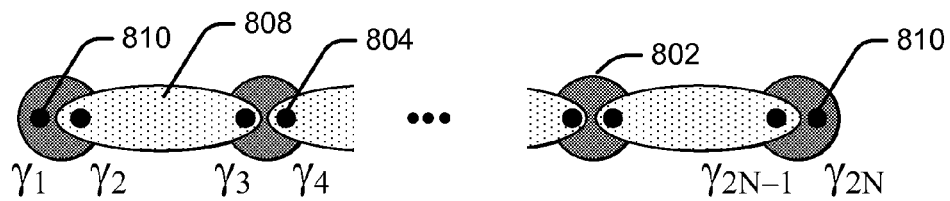

The pairings exhibited for these two special cases are characteristic of their corresponding phases, as shown in FIGS. 8A and 8B. FIGS. 8A and 8B show characteristic pairing of the two gapped phases of Kitaev's fermionic chain model of Eq. (15). Fermionic sites, represented as shaded circles, 802 can be expressed in terms of two Majorana operators $\gamma_{2j-1}$ and $\gamma_{2j}$, represented as solid black circles, 804. In the trivial phase, as shown in FIG. 8A, the dominant interaction, represented by shaded oval, 806 is between pairs of Majorana operators $\gamma$ 804 on the same site 802. In the non-trivial phase, as shown in FIG. 8B, the dominant interaction 808 is between pairs of Majorana operators $\gamma$ 804 on adjacent sites and there is an unpaired Majorana operator 810 localized at each end of the chain, which give rise to twofold-degenerate ground states. (The unpaired Majorana operators 810 are also known as Majorana zero modes.) For the general case in the topological phase, as shown in FIG. 8B, the ground state degeneracy and zero mode localization is topological, meaning they will generally not be exact, but rather involve corrections that are exponentially suppressed in the length of the chain as $O(e^{-\alpha N})$, for some constant $\alpha$, and they will be robust to deformations of the Hamiltonian that do not close the gap. In other words, they are actually Majorana $\epsilon$ modes with $\epsilon = O(e^{-\alpha N})$.

Figure 9A:
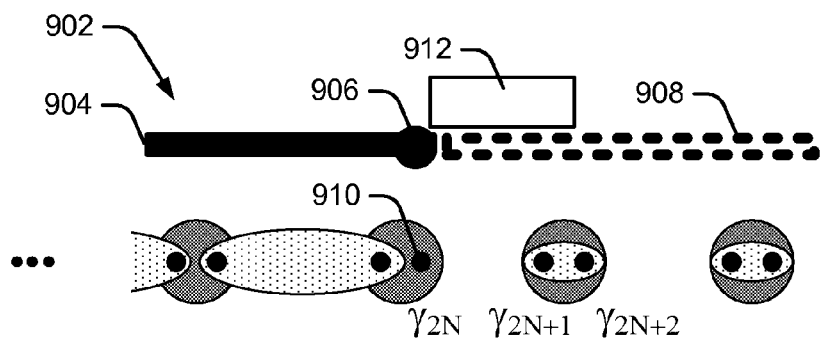
FIGS. 9A and 9B are schematic diagrams of an example Majorana wire being extended.
Figure 9B:
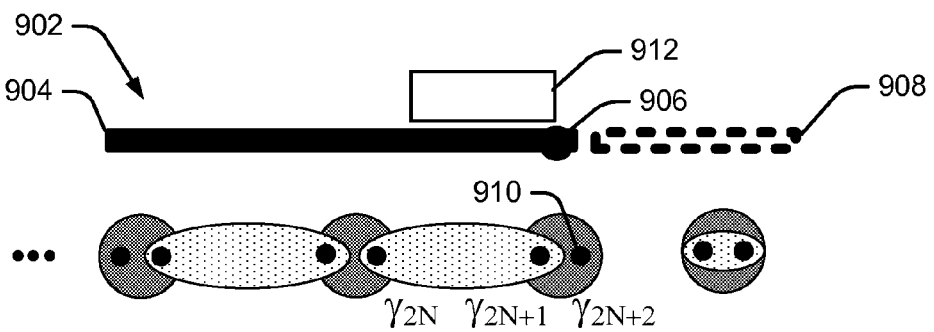

FIGS. 9A and 9B illustrate operations that move one of the endpoints of the wires and, hence, the Majorana zero mode is localized there. FIGS. 9A and 9B show a wire 902 having a topological wire segment 904 with an endpoint 906 and a topologically trivial or a non-topological wire segment 908. The endpoint 906 has an associated Majorana zero mode 910. The topological wire segment 904 may be extended or retracted. This can be done by with a system tuner 912 that tunes local system parameters to extend the topological wire segment 904 into a region of non-topological wire segment 908 or retract the endpoint 906 from a region of the topological wire segment 904. In the discretized model, this amounts to adiabatically tuning the Hamiltonian at the interface of the trivial segment and the nontrivial one, so that a site 914 initially in the non-topological phase becomes the new endpoint of the wire in the topological phase, or vice-versa.

To be concrete, consider the Hamiltonian H(t), which acts as $H_b$ on sites 1, . . . , N and as $H_a$ on sites N+2, N+3, . . . , for all t, while its time-dependent action on the Majorana operators $\gamma_{2N}$, $\gamma_{2N+1}$ and $\gamma_{2N+2}$ (associated with sites N and N+1) is given by $$H(t) = \left(1 - \frac{t}{\tau}\right)\left[\left(\frac{-\mu}{2}\right)i\gamma_{2N+1}\gamma_{2N+2}\right] + \left(\frac{t}{\tau}\right)[wi\gamma_{2N}\gamma_{2N+1}] \quad (20)$$

for $0 \le t \le \tau$. This locally takes the Hamiltonian from the form $H_a$ at t=0 to $H_b$ at t=$\tau$ on site N+1, extending the length of the (b) phase region and moving the zero mode from site N (associated with $\gamma_{2N}$) to site N+1 (associated with $\gamma_{2N+2}$). It should be clear that this has exactly the form of time-dependent Hamiltonians satisfying properties 1-3 previously described. In particular, using the mapping between Ising anyons and Majorana fermion zero modes previously explained, one can replace the Majorana operators $\gamma_j$ with $\sigma$ Ising anyons. The unoccupied fermionic state of a pair of Majorana operators corresponds to a pair of $\sigma$ anyons fusing into the I channel and the occupied fermionic state corresponds to them fusing into the $\psi$ channel. The pairwise interaction $i\gamma_j\gamma_k$ maps to the interaction $V^{(jk)} = 1 - 2\Pi_I^{(jk)}$ of Ising anyons, which energetically favors the $b_{jk}$=I fusion channel. Thus, one can view this operation, which extends the Majorana wire and moves the zero mode from site N to site N+1, as an anyonic teleportation of the anyonic state information encoded in anyon 2N to anyon 2N+2. The "ancillary anyons" in this case are drawn from and absorbed into the bulk of the wires. The relation to anyonic teleportation can be seen clearly by comparing the discretized model in FIGS. 9A and 9B to FIG. 5. In order to retract the nontrivial wire segment, one simply needs to run this process in reverse. The (special case) Hamiltonian described in this paragraph provides the cleanest example for changing a segment between the (a) and (b) phases and its relation to anyonic teleportation, but the general case is qualitatively the same.

Figure 10:
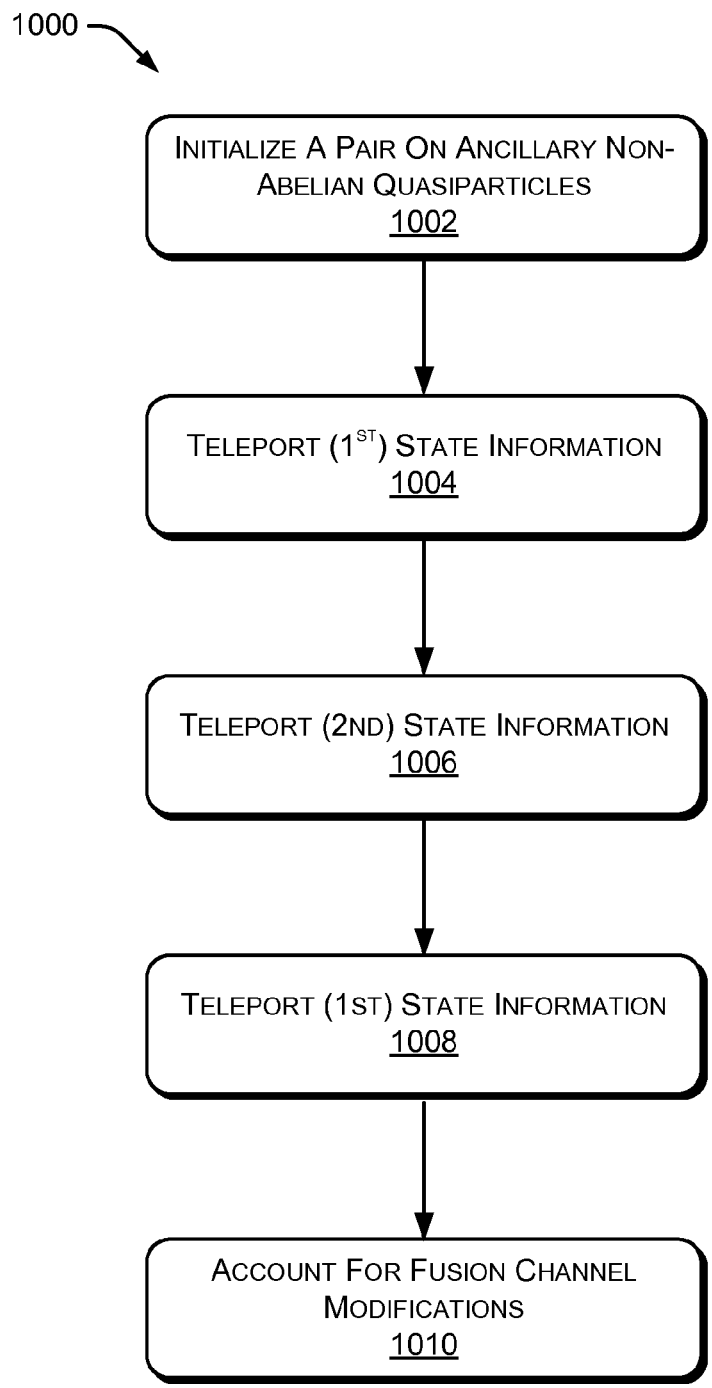
FIG. 10 is a flow diagram for an example process of generating an exchange transformation for non-Abelian quasiparticles.
Figure 11A:
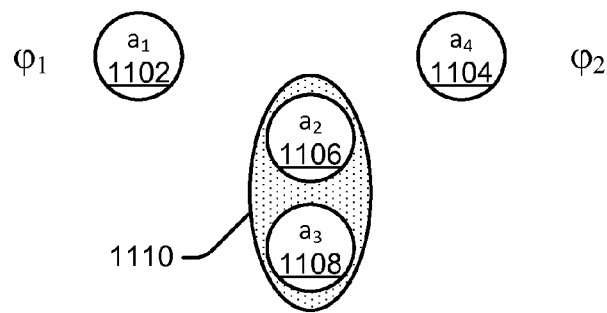
FIGS. 11A-11D are schematic diagrams for a system of non-Abelian quasiparticles going through a series of operations that generates an exchange transformation.
Figure 11B:
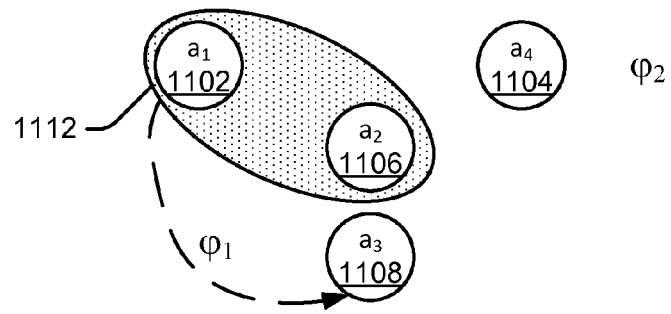
Figure 11C:
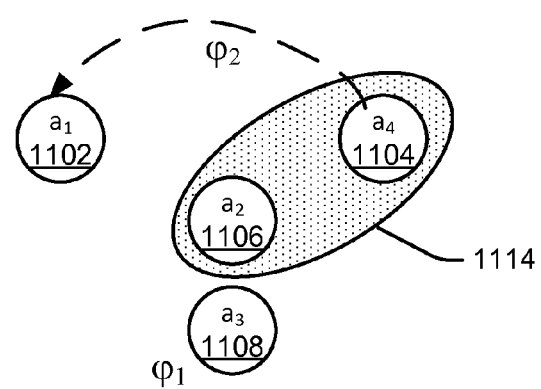
Figure 11D:
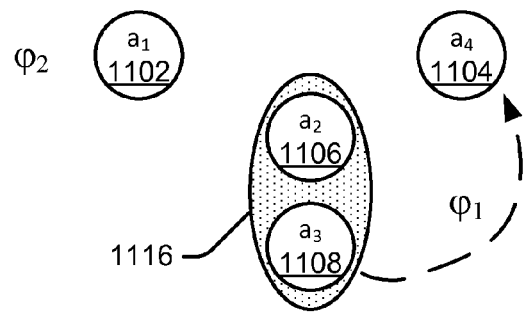

FIG. 10 shows an example process 1000 for generating an exchange transformation on the state space of a pair of non-Abelian quasiparticles, and FIGS. 11A-11D diagram interactions between the non-Abelian quasiparticles employed in the generation of exchange transformations at various states. Referring to FIG. 11A, an exchange transformation is to be generated for a pair of "computational non-Abelian quasiparticles" (i.e., non-Abelian quasiparticles $a_1$ 1102 and $a_4$ 1104). Generating an exchange transformation of the "computational non-Abelian quasiparticles" involves a pair of "ancillary quasiparticles" (i.e., quasiparticles $a_2$ 1106 and $a_3$ 1108).

At 1002, the pair of ancillary quasiparticles is initialized. As shown in FIG. 11A, the "computational non-Abelian quasiparticles" (i.e., non-Abelian quasiparticles $a_1$ 1102 and $a_4$ 1104) encode state information $\phi_1$ and $\phi_2$, respectively, and the ancillary quasiparticles (i.e., quasiparticles $a_2$ 1106 and $a_3$ 1108) have an interaction 1110. The interaction 1110 may place the quasiparticles $a_2$ 1106 and $a_3$ 1108 into a preferred fusion channel and/or into a preferred state (e.g., trivial state).

At 1004, state information $\phi_1$ is teleported from non-Abelian quasiparticle $a_1$ 1102 to quasiparticle $a_3$ 1108. The state information $\phi_1$ is teleported by adiabatically inducing interaction 1112 between non-Abelian quasiparticle $a_1$ 1102 and quasiparticle $a_2$ 1106. (See, FIG. 11B.) In some instances, the interaction 1110 may be adiabatically reduced while the interaction 1112 is increased. In some instances, the interaction 1112 may be adiabatically increased such that it becomes the dominant interaction and/or until the interaction 1110 becomes negligible.

At 1006, state information $\phi_2$ is teleported from non-Abelian quasiparticle $a_4$ 1104 to non-Abelian quasiparticle $a_1$ 1102. The state information $\phi_2$ is teleported by adiabatically inducing interaction 1114 between non-Abelian quasiparticle $a_4$ 1104 and quasiparticle $a_2$ 1106. (See, FIG. 11C.) In some instances, the interaction 1112 may be adiabatically reduced while the interaction 1114 is increased. In some instances, the interaction 1114 may be adiabatically increased such that it becomes the dominant interaction and/or until the interaction 1112 becomes negligible.

At 1008, state information $\phi_1$ is teleported from quasiparticle $a_3$ 1108 to non-Abelian quasiparticle $a_4$ 1104. The state information $\phi_1$ is teleported by adiabatically inducing interaction 1116 between quasiparticles $a_2$ 1106 and $a_3$ 1108. (See, FIG. 11D.) In some instances, the interaction 1114 may be adiabatically reduced while the interaction 1116 is increased. In some instances, the interaction 1116 may be adiabatically increased such that it becomes the dominant interaction and/or until the interaction 1114 becomes negligible.

At 1010, the modification of the exchange transformation, which is introduced by way of the topological charge projectors applied in the teleportations, is accounted for. In some embodiments, the modification may be removed before either one or both of the "computational non-Abelian quasiparticles" interact with other quasiparticle and/or before a measurement of the anyonic state of the "computational non-Abelian quasiparticles." In some embodiments, the modification may be removed by an interaction, measurement, projection operator, etc. In some embodiments, the modification may be accounted for during the lifetime of either one of the "computational non-Abelian quasiparticles" and may be accounted for, if still present, at a time of measurement of a state of either one or both of the "computational non-Abelian quasiparticles."

This disclosure may be applied to $\mathbb{Z}_n$-Parafendleyon wires. These can be thought of as generalizations of Majorana wires for which the zero modes localized at the endpoints possess 2n Abelian fusion channels, rather than two. The above results similarly explain the possibility of realizing different transformations when exchanging the zero modes (though in the general case, it is not simply the difference between counterclockwise and clockwise braiding chiralities).

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of transforming states of non-Abelian quasiparticles, comprising:
   teleporting, via an ancillary pair of quasiparticles, first state information of a first computational non-Abelian quasiparticle to a second computational non-Abelian quasiparticle by adiabatically inducing a first interaction between at least one of the first computational non-Abelian quasiparticle and the second computational non-Abelian quasiparticle and at least one of the pair of ancillary quasiparticles; and
   teleporting second state information of the second computational non-Abelian quasiparticle to the first computational non-Abelian quasiparticle.

2. The method of claim 1, wherein teleporting, via the ancillary pair of quasiparticles, first state information of the first computational non-Abelian quasiparticle to the second computational non-Abelian quasiparticle further comprises:
   teleporting the first state information from the first computational non-Abelian quasiparticle to a first ancillary quasiparticle of the pair of ancillary quasiparticles; and
   teleporting the first state information from the first ancillary quasiparticle to the second computational non-Abelian quasiparticle.

3. The method of claim 2, wherein the first state information is teleported from the first computational non-Abelian quasiparticle to the first ancillary quasiparticle of the pair of ancillary quasiparticle based on the first induced interaction, wherein the first interaction is between the first computational non-Abelian quasiparticle and a second ancillary quasiparticle of the pair of ancillary quasiparticles.

4. The method of claim 3, wherein teleporting the first state information from the first ancillary quasiparticle to the second computational non-Abelian quasiparticle further comprises:
   adiabatically inducing a second interaction, wherein the second adiabatic interaction is between the first ancillary quasiparticle and the second ancillary quasiparticle of the pair of ancillary quasiparticles.

5. The method of claim 4, wherein the second interaction is dominant over the first interaction.

6. The method of claim 1, wherein teleporting second state information of the second computational non-Abelian quasiparticle to the first computational non-Abelian quasiparticle further comprises:
   inducing an interaction between the second computational non-Abelian quasiparticle and a first ancillary quasiparticle of the pair of ancillary quasiparticle.

7. The method of claim 1, further comprising:
   initializing the pair of ancillary quasiparticles to be in an Abelian fusion channel.

8. A method of generating exchange transformations for non-Abelian quasiparticles, comprising:
   teleporting first state information of a first computational non-Abelian quasiparticle to a first ancillary quasiparticle of a pair of ancillary quasiparticles;
   teleporting second state information of a second computational non-Abelian quasiparticle to the first computational non-Abelian quasiparticle; and
   teleporting the first state information from the first ancillary quasiparticle to the second computational non-Abelian quasiparticle,
   wherein teleporting the first state information of the first computational non-Abelian quasiparticle to the first ancillary quasiparticle of the pair of ancillary quasiparticle comprises inducing an interaction, wherein the interaction is between the first computational non-Abelian quasiparticle and a second ancillary quasiparticle of the pair of ancillary quasiparticles and the interaction is a first interaction, and wherein the inducing the first interaction comprises concurrently increasing the first interaction while reducing a second interaction, wherein the second interaction is between the first ancillary quasiparticle and the second ancillary quasiparticle of the pair of ancillary quasiparticles.

9. The method of claim 8, further comprising:
   initializing the pair of ancillary quasiparticles to be in an Abelian fusion channel.

10. The method of claim 8, wherein teleporting the first state information from the first ancillary quasiparticle to the second computational non-Abelian quasiparticle further comprises:
    adiabatically inducing an interaction between the first ancillary quasiparticle and a second ancillary quasiparticle of the pair of ancillary quasiparticles.

11. A method of generating exchange transformations for non-Abelian quasiparticles, comprising:
    teleporting first state information of a first computational non-Abelian quasiparticle to a first ancillary quasiparticle of a pair of ancillary quasiparticles;

teporting second state information of a second computational non-Abelian quasiparticle to the first computational non-Abelian quasiparticle; and teleporting the first state information from the first ancillary quasiparticle to the second computational non-Abelian quasiparticle, wherein teleporting the first state information of the first computational non-Abelian quasiparticle to the first ancillary quasiparticle of the pair of ancillary quasiparticle comprises inducing an interaction, wherein the interaction is between the first computational non-Abelian quasiparticle and a second ancillary quasiparticle of the pair of ancillary quasiparticles and inducing the interaction comprises adiabatically increasing the interaction such that the interaction dominates over an initial interaction between the first ancillary quasiparticle and the second ancillary quasiparticle of the pair of ancillary quasiparticles.

12. A method of generating exchange transformations for non-Abelian quasiparticles, comprising:

teleporting first state information of a first computational non-Abelian quasiparticle to a first ancillary quasiparticle of a pair of ancillary quasiparticles;

teleporting second state information of a second computational non-Abelian quasiparticle to the first computational non-Abelian quasiparticle; and teleporting the first state information from the first ancillary quasiparticle to the second computational non-Abelian quasiparticle, wherein teleporting the first state information from the first ancillary quasiparticle to the second computational non-Abelian quasiparticle comprises adiabatically inducing an interaction between the first ancillary quasiparticle and a second ancillary quasiparticle of the pair of ancillary quasiparticles, and wherein interaction is a first interaction, and the adiabatically inducing the first interaction between the first ancillary quasiparticle and the second ancillary quasiparticle of the pair of ancillary quasiparticles comprises:

adiabatically decreasing a second interaction while concurrently increasing the first interaction, wherein the second interaction is between the second computational non-Abelian quasiparticle and the second ancillary quasiparticle.

13. A topological quantum computing device, comprising:

a first computational, non-Abelian quasiparticle having first state information and a second computational, non-Abelian quasiparticle having second state information;

a first ancillary quasiparticle and a second ancillary quasiparticle; and a quasiparticle interactor that is configured to teleport by adiabatically inducing an interaction between two or more of the first computational, non-Abelian quasiparticle, the second computational, non-Abelian quasiparticle, the first ancillary quasiparticle, and the second ancillary quasiparticle, via the first and second ancillary quasiparticle, the first and second state information, wherein after the teleportation, the first computational, non-Abelian quasiparticle has the second state information and the second computational, non-Abelian quasiparticle has the first state information.

14. The topological quantum computing device of claim 13, further comprising:

an initializer component that is configured to initialize the first ancillary quasiparticle and the second ancillary quasiparticle into a particular fusion channel.

15. The topological quantum computing device of claim 14, wherein the initializer component comprises an interferometer.

16. The topological quantum computing device of claim 13, wherein the first ancillary quasiparticle and the second ancillary quasiparticle are initialized to a topologically trivial phase.

17. The topological quantum computing device of claim 13, wherein the first and the second computational, non-Abelian quasiparticle comprise Majorana quasiparticles.

18. The topological quantum computing device of claim 13, further comprising:

a nanowire in topological phase having an end, wherein one of the first and the second computational, non-Abelian quasiparticle is localized at the end of the nanowire.

* * * * *